US009416015B2

(12) United States Patent
Yoshikawa et al.

(10) Patent No.: US 9,416,015 B2
(45) Date of Patent: *Aug. 16, 2016

(54) METHOD OF PRODUCING SILICA PARTICLES

(75) Inventors: Hideaki Yoshikawa, Kanagawa (JP);
Yuka Zenitani, Kanagawa (JP);
Hiroyoshi Okuno, Kanagawa (JP);
Shunsuke Nozaki, Kanagawa (JP);
Shinichiro Kawashima, Kanagawa (JP);
Sakae Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 1350 days.

This patent is subject to a terminal disclaimer.

(21) Appl. No.: 12/906,405

(22) Filed: Oct. 18, 2010

(65) Prior Publication Data

US 2011/0319647 A1    Dec. 29, 2011

(30) Foreign Application Priority Data

Jun. 23, 2010  (JP) ................................. 2010-143031

(51) Int. Cl.
| C01B 33/12 | (2006.01) |
| C01B 33/148 | (2006.01) |
| C01B 33/141 | (2006.01) |
| C01B 33/145 | (2006.01) |
| C01B 33/146 | (2006.01) |

(52) U.S. Cl.
CPC ............. *C01B 33/148* (2013.01); *C01B 33/141* (2013.01); *C01B 33/145* (2013.01); *C01B 33/146* (2013.01)

(58) Field of Classification Search
CPC .. C01B 33/141; C01B 33/148; C01B 33/146; C01B 33/145; C01B 33/12; C01B 33/00; C01B 33/18; C07F 7/02
USPC ................... 423/335–343, 349–350; 502/240
See application file for complete search history.

(56) References Cited

U.S. PATENT DOCUMENTS

| 4,775,520 A | 10/1988 | Unger et al. |
| 4,911,903 A | 3/1990 | Unger et al. |
| 5,221,497 A | 6/1993 | Watanabe et al. |
| 5,597,512 A | 1/1997 | Watanabe et al. |
| 5,609,675 A | 3/1997 | Noritake et al. |
| 5,985,229 A | 11/1999 | Yamada et al. |
| 6,521,290 B1 * | 2/2003 | Kudo et al. .................. 427/214 |
| 2006/0112860 A1 * | 6/2006 | Yoshitake et al. ............ 106/490 |
| 2006/0150860 A1 * | 7/2006 | Nozaki ............................. 106/3 |
| 2008/0069753 A1 * | 3/2008 | Floess et al. .................. 423/335 |
| 2008/0086951 A1 | 4/2008 | Wakamiya et al. |
| 2008/0241044 A1 | 10/2008 | Kuebelbeck |

FOREIGN PATENT DOCUMENTS

| CN | 86 1 06689 A | 5/1987 |
| CN | 1930082 A | 3/2007 |
| EP | 0 574 642 A1 | 12/1993 |
| JP | A-62-52119 | 3/1987 |
| JP | A-63-310714 | 12/1988 |
| JP | A-1-317115 | 12/1989 |
| JP | A-4-187512 | 7/1992 |
| JP | A-6-254383 | 9/1994 |
| JP | A-7-118008 | 5/1995 |
| JP | A-7-277725 | 10/1995 |
| JP | A-8-12305 | 1/1996 |
| JP | A-9-202612 | 8/1997 |
| JP | A-11-60232 | 3/1999 |
| JP | A-2001-150334 | 6/2001 |
| JP | A-2002-38049 | 2/2002 |
| JP | A-2003-133267 | 5/2003 |
| JP | A-2003-165718 | 6/2003 |
| JP | A-2004-35293 | 2/2004 |
| JP | A-2004-203638 | 7/2004 |
| JP | A-2007-22827 | 2/2007 |
| JP | A-2008-169102 | 7/2008 |
| JP | A-2009-78935 | 4/2009 |
| JP | A-2009-137791 | 6/2009 |
| JP | A-2009-149493 | 7/2009 |
| JP | A-2009-161371 | 7/2009 |
| JP | A-2011-185998 | 9/2011 |

OTHER PUBLICATIONS

Choi et al., Formation and CHaracterization of Monodisperse, Spherical Organo-Silica Powders from Organo-AlkoxysilaneWater System, 1998, J. Am. Ceram. Soc. , 81, 1184-88.*
Kim et al., "Influence of reaction conditions on sol-precipitation process producing silicon oxide particles," *Ceramics International* , 2002, pp. 187-194, vol. 28, Elsevier Science Ltd. and Techna S.r.l.
Wang et al., "Preparation of spherical silica particles by Stöber process with high concentration of tetra-ethyl-orthosilicate," *Journal of Colloid and Interface Science*, 2009, pp. 23-29, vol. 341, Elsevier Inc.
Nagao et al., "Particle formation in the hydrolysis of tetraethyl orthosilicate in pH buffer solution," *Journal of Colloid and Interface Science*, 2004, pp. 143-149, vol. 279, Elsevier Inc.
Oct. 15, 2013 Japanese Office Action issued in Japanese Patent Application No. 2010-143031 (with translation).
Nov. 5, 2013 Chinese Office Action issued in Chinese Patent Application No. 201010542951.3 (with translation).

\* cited by examiner

*Primary Examiner* — Melvin C Mayes
*Assistant Examiner* — Smita Patel
(74) *Attorney, Agent, or Firm* — Oliff PLC

(57) ABSTRACT

The invention provides a method of producing silica particles, the method including preparing an alkali catalyst solution containing an alkali catalyst in a solvent including an alcohol, at a concentration of from about 0.6 mol/L to about 0.85 mol/L; and supplying tetraalkoxysilane into the alkali catalyst solution, and concurrently supplying an alkali catalyst into the alkali catalyst solution at a rate of from about 0.1 mol to about 0.4 mol per mole of the total amount of supply of the tetraalkoxysilane supplied in one minute.

17 Claims, No Drawings

METHOD OF PRODUCING SILICA PARTICLES

CROSS-REFERENCE TO RELATED APPLICATIONS

This application is based on and claims priority under 35 USC 119 from Japanese Patent Application No. 2010-143031 filed on Jun. 23, 2010.

BACKGROUND

1. Field of the Invention

The present invention relates to a method of producing silica particles.

2. Related Art

Concerning the production method for silica particles, there are known dry-method silicas such as fumed silica obtainable by gas phase high-temperature thermolysis of silicon halides, and fused silica produced by melting pulverized raw material silica stone in a high-temperature flame and sphericalizing the molten silica under the action of surface tension; and wet-method silicas such as an aqueous silica sol obtainable by using water glass as a raw material and subjecting the water glass to neutralization with an acid or to ion exchange, and an alcoholic silica sol obtainable by subjecting an alkyl silicate to hydrolysis and a condensation reaction in an alcohol solution in the presence of an alkali catalyst such as ammonia.

SUMMARY

According to an aspect of the present invention, there is provided a method of producing silica particles, the method including:

preparing an alkali catalyst solution containing an alkali catalyst in a solvent including an alcohol, at a concentration of from about 0.6 mol/L to about 0.85 mol/L; and supplying tetraalkoxysilane into the alkali catalyst solution, and concurrently supplying an alkali catalyst into the alkali catalyst solution at a rate of from about 0.1 mol to about 0.4 mol per mole of the total amount of supply of the tetraalkoxysilane supplied in one minute.

DETAILED DESCRIPTION OF THE INVENTIONS

An exemplary embodiment of the invention will be described in detail.

The method of producing silica particles according to the present exemplary embodiment includes the steps of preparing an alkali catalyst solution containing an alkali catalyst in a solvent including an alcohol, at a concentration of from 0.6 or about 0.6 mol/L to 0.85 or about 0.85 mol/L (hereinafter, may be referred to as "alkali catalyst solution preparing step"); and supplying a tetraalkoxysilane to the alkali catalyst solution and concurrently supplying an alkali catalyst in an amount of from 0.1 or about 0.1 moles to 0.4 or about 0.4 moles per mole of the total amount of supply of the tetraalkoxysilane that is supplied in one minute (hereinafter, may be referred to as "particle generating step").

That is, the method of producing silica particles according to the present exemplary embodiment is a method of generating silica particles by allowing a tetraalkoxysilane to react in the presence of an alcohol containing an alkali catalyst at the concentration mentioned above, while separately supplying the raw material tetraalkoxysilane and the alkali catalyst serving as a catalyst, in the amounts that are related in the relationship described above.

In the method of producing silica particles according to the present exemplary embodiment, the occurrence of coarse aggregates is reduced and atypically shaped silica particles are obtained, as a result of employing the technique described above. The reason for this is not clearly known, but it is thought to be based on the following factors.

First, when an alkali catalyst solution containing an alkali catalyst in a solvent which includes alcohol is prepared, and when a tetraalkoxysilane and an alkali catalyst are separately supplied into this solution, the tetraalkoxysilane supplied into the alkali catalyst solution undergoes a reaction, and thereby, nuclear particles are generated. It is thought that, at this time, when the alkali catalyst concentration in the alkali catalyst solution is in the range described above, atypically shaped nuclear particles are generated, while the generation of coarse aggregates such as secondary aggregates is suppressed. This is believed to be based on the following reason. In addition to its catalytic action, the alkali catalyst coordinates with the surface of the nuclear particles that are generated and contributes to the shape and dispersion stability of the nuclear particles. However, when the amount is in the range mentioned above, the alkali catalyst does not uniformly cover the surface of the nuclear particles (that is, the alkali catalyst is unevenly distributed on the surface of the nuclear particles and adheres to the surface). Accordingly, even though the dispersion stability of the nuclear particles is maintained, there occurs partial bias in the surface tension and chemical affinity of the nuclear particles, and thus atypically shaped nuclear particles are generated.

When the supplies of the tetraalkoxysilane and the alkali catalyst are respectively continued, the nuclear particles that are generated grow as a result of the reaction of the tetraalkoxysilane, and thereby silica particles are obtained. Here, it is believed that when these supplies of the tetraalkoxysilane and the alkali catalyst are carried out while the amounts of supply are maintained to be in the relationship described above, the atypically shaped nuclear particles grow into particles while maintaining the atypical shape, with the generation of coarse aggregates such as secondary aggregates being suppressed, and as a result, atypically shaped silica particles are generated. This is believed to be because, when these amounts of supply of the tetraalkoxysilane and the alkali catalyst are maintained in the relationship described above, the dispersion of the nuclear particles is maintained, while the partial bias in the tension and chemical affinity at the nuclear particle surface is maintained, and therefore, the nuclear particles grow into particles while maintaining the atypical shape.

From the viewpoint described above, it is thought that when the method of producing silica particles according to the present exemplary embodiment is employed, coarse aggregates are generated at a reduced level, and atypically shaped silica particles are obtained.

Here, the atypically shaped silica particles are, for example, silica particles having an average degree of circularity of from 0.5 or about 0.5 to 0.85 or about 0.85.

Furthermore, it is thought that in the method of producing silica particles according to the present exemplary embodiment, atypically shaped nuclear particles are generated, and the nuclear particles are allowed to grow while maintaining this atypical shape, to thereby generate silica particles. Therefore, it is thought that atypically shaped silica particles having high shape-stability against a mechanical load and having less non-uniformity in the shape distribution, are obtained.

It is also thought that since the atypically shaped nuclear particles that are generated grow into particles while maintaining the atypical shape, and thus silica particles are obtained in the method of producing silica particles according to the present exemplary embodiment, silica particles that are strong against a mechanical load and are difficult to break, are obtained.

Furthermore, in the method of producing silica particles according to the present exemplary embodiment, when a tetraalkoxysilane and an alkali catalyst are separately supplied into an alkali catalyst solution, a reaction of the tetraalkoxysilane is induced, and thereby the generation of particles is achieved. Therefore, the total amount of the alkali catalyst used is reduced as compared with the case of producing atypically shaped silica particles by a conventional sol-gel method, and as a result, the omission of a step for the removal of alkali catalyst is also realized. This is advantageous in the case of applying the silica particles to a product where high purity is demanded.

Hereinafter, the respective steps will be explained.

First, the alkali catalyst solution preparing step will be explained.

In the alkali catalyst solution preparing step, a solvent including an alcohol is provided, an alkali catalyst is added to this solvent, and thereby an alkali catalyst solution is prepared.

The solvent including an alcohol may be a solvent of an alcohol only, or if necessary, may be a mixed solvent with another solvent such as water, a ketone (for example, acetone, methyl ethyl ketone, or methyl isobutyl ketone), a cellosolve (for example, methylcellosolve, ethylcellosolve, butylcellosolve or cellosolve acetate), or an ether (for example, dioxane, or tetrahydrofuran). If the solvent is a mixed solvent, the amount of alcohol with respect to the other solvents is desirably 80% or about 80% by weight or greater (preferably, 90% or about 90% by weight or greater).

The alcohol may be, for example, a lower alcohol such as methanol or ethanol.

On the other hand, the alkali catalyst is a catalyst intended to accelerate the reaction of tetraalkoxysilane (hydrolysis reaction and condensation reaction), and examples thereof include basic catalysts such as ammonia, urea, monoamine, and a quaternary ammonium salt. In this case, ammonia is particularly preferred.

The concentration (content) of the alkali catalyst is from 0.6 or about 0.6 mol/L to 0.85 or about 0.85 mol/L, desirably from 0.63 or about 0.63 mol/L to 0.78 or about 0.78 mol/L, and more desirably from 0.66 or about 0.66 mol/L to 0.75 or about 0.75 mol/L.

If the concentration of the alkali catalyst is less than 0.6 mol/L, the dispersibility of the nuclear particles in the course of growth of the nuclear particles that are generated are unstabilized, so that coarse aggregates such as secondary aggregates are generated, or gelation occurs. Thus, the particle size distribution may be deteriorated.

On the other hand, if the concentration of the alkali catalyst is greater than 0.85 mol/L, the nuclear particles that are generated are excessively stabilized, and nuclear particles having a true spherical shape are generated, so that atypically shaped nuclear particles are not obtained. As a result, atypically shaped silica particles are not obtained.

Here, the concentration of the alkali catalyst is the concentration with respect to the alcohol catalyst solution (alkali catalyst+solvent including alcohol).

Next, the particle generating step will be explained.

The particle generating step is a step of generating silica particles by separately supplying a tetraalkoxysilane and an alkali catalyst into the alkali catalyst solution, and allowing the tetraalkoxysilane to react (hydrolysis reaction and condensation reaction) in the alkali catalyst solution.

In this particle generating step, nuclear particles are generated by the reaction of the tetraalkoxysilane in the early stage of the supply of the tetraalkoxysilane (nuclear particle generation stage), these nuclear particles undergo growth (nuclear particle growth stage), and thus silica particles are generated.

Examples of the tetraalkoxysilane that is supplied into the alkali catalyst solution include tetramethoxysilane, tetraethoxysilane, tetrapropoxysilane, and tetrabutoxysilane, but from the viewpoint of the controllability of the reaction rate, and of the shape, particle size, particle size distribution and the like of the silica particles obtainable, tetramethoxysilane and tetraethoxysilane are preferred.

The amount of supply of the tetraalkoxysilane is, for example, suitably from 0.001 or about 0.001 mol/(mol·min) to 0.01 or about 0.01 mol/(mol·min), desirably from 0.002 or about 0.002 mol/(mol·min) to 0.009 or about 0.009 mol/(mol·min), and more desirably from 0.003 or about 0.003 mol/(mol·min) to 0.008 or about 0.008 mol/(mol·min), relative to the number of moles of the alcohol in the alkali catalyst solution.

When this amount of supply of the tetraalkoxysilane is adjusted to the range mentioned above, the occurrence of coarse aggregates is reduced, and the generation of atypically shaped silica particles is facilitated.

Here, this amount of supply of the tetraalkoxysilane represents the number of moles of the tetraalkoxysilane supplied for one minute, per mole of the alcohol in the alkali catalyst solution.

On the other hand, examples of the alkali catalyst supplied in the alkali catalyst solution include those mentioned above as examples. This alkali catalyst that is supplied may be of the same type as the alkali catalyst that is previously incorporated into the alkali catalyst solution, or may be of different type; however, it is preferable that the alkali catalyst be of the same type.

The amount of supply of the alkali catalyst is adjusted from 0.1 moles to 0.4 moles with respect to one mole of the total amount of supply of the tetraalkoxysilane supplied in one minute, and the amount of supply is desirably from 0.14 moles to 0.35 moles, and more desirably from 0.18 moles to 0.3 moles.

If the amount of supply of the alkali catalyst is less than 0.1 moles, the dispersibility of the nuclear particles in the course of growth of the nuclear particles thus generated is unstabilized, so that coarse aggregates such as secondary aggregates are generated, or gelation occurs. Thus, the particle size distribution may be deteriorated.

On the other hand, if the amount of supply of the alkali catalyst is greater than 0.4 moles, the nuclear particles generated are excessively stabilized, and even if atypically shaped nuclear particles are generated in the nuclear particle generation stage, the nuclear particles grow into a spherical shape during the nuclear particle growth stage, so that atypically shaped silica particles are not obtained.

Here, in the particle generating step, while the tetraalkoxysilane and the alkali catalyst are separately supplied into the alkali catalyst solution, this supply method may be a method of continuously supplying the materials, or may be a method of intermittently supplying the materials.

Furthermore, in the particle generating step, the temperature of the alkali catalyst solution (temperature upon supply) is, for example, suitably from 5° C. or about 5° C. to 50° C. or about 50° C., and desirably in the range of from 15° C. or about 15° C. to 40° C. or about 40° C.

Thus, silica particles are obtained through these steps described above. In this circumstance, the silica particles that are obtainable are obtained in the form of dispersion liquid, and this dispersion liquid may be used directly as a silica particle dispersion liquid, or the silica particles may be extracted and used as a powder after removing the solvent.

When the silica particles are used in the form of a silica particle dispersion liquid, the solids concentration of the silica particles may be adjusted by diluting the dispersion liquid with water or alcohol or by concentrating the dispersion liquid, as necessary. Furthermore, the silica particle dispersion liquid may be used after being subjected to solvent substitution with a water-soluble organic solvent such as another alcohol, an ester or a ketone.

On the other hand, in the case of using the silica particles in the form of a powder, it is necessary to remove the solvent from the silica particle dispersion liquid, and as the method of removing this solvent, a known method may be used, such as: 1) a method of removing the solvent by filtration, centrifugation, distillation or the like, and then drying the residue with a vacuum dryer, a tray dryer or the like; or 2) a method of directly drying the slurry with a fluidized bed dryer, a spray dryer or the like. The drying temperature is not particularly limited, but is desirably 200° C. or lower or about 200° C. or lower. If the drying temperature is higher than 200° C., the coupling of primary particles due to the condensation of the silanol groups present on the surface of the silica particles, or the generation of coarse particles, is prone to occur.

It is preferable to subject the dried silica particles to the removal of coarse particles or aggregates through disintegration and sieving, as necessary. The method of disintegration is not particularly limited, but is carried out by using, for example, a dry pulverizing apparatus such as a jet mill, a vibrating mill, a ball mill or a pin mill. The method of sieving is carried out by using, for example, a known apparatus such as a vibrating screen or a wind sifter.

The silica particles that are obtainable by the method of producing silica particles according to the present exemplary embodiment may be used after having the surface of the silica particles hydrophobized with a hydrophobization treating agent (hereinafter, it may be referred to as hydrophobized silica particles).

The hydrophobization treating agent may be, for example, a known organosilicon compound having an alkyl group (for example, a methyl group, an ethyl group, a propyl group, or a butyl group), and specific examples thereof include silazane compounds (for example, silane compounds such as methyltrimethoxysilane, dimethyldimethoxysilane, trimethylchlorosilane, and trimethylmethoxysilane; hexamethyldisilazane, and tetramethyldisilazane). The hydrophobization treating agent may be used singly, or plural kinds of hydrophobization treating agents may be used.

Among these hydrophobization treating agents, organosilicon compounds having a trimethyl group, such as trimethylmethoxysilane and hexamethyldisilazane, are suitable.

The amount of use of the hydrophobization treating agent is not particularly limited, but in order to obtain the effect of hydrophobization, for example, the amount of use is suitably from 1% or about 1% by weight to 100% or about 100% by weight, and desirably from 5% or about 5% by weight to 80% or about 80% by weight, based on the silica particles.

An example of the method of obtaining a dispersion liquid of hydrophobic silica particles which have been subjected to a hydrophobization treatment with a hydrophobization treating agent, may be a method of obtaining a hydrophobic silica particle dispersion liquid by adding a necessary amount of a hydrophobization treating agent to a silica particle dispersion liquid, allowing the silica particles to react under stirring at a temperature in the range of from 30 to 80° C., and thereby subjecting the silica particles to a hydrophobization treatment. When this reaction temperature is lower than 30° C., the hydrophobization reaction is difficult to proceed, and at a temperature exceeding 80° C., gelation of the dispersion liquid due to the self-condensation of the hydrophobization treating agent, or aggregation of the silica particles, is prone to occur.

On the other hand, examples of the method of obtaining hydrophobic silica particles in a powder form include a method of obtaining hydrophobic silica particles in a powder form by first obtaining hydrophobic silica particle dispersion liquid by the methods described above, and then drying the dispersion liquid by the method described above; a method of obtaining hydrophobic silica particles in a powder form by drying a silica particle dispersion liquid to obtain hydrophilic silica particles in a powder form, and then adding a hydrophobization treating agent to apply a hydrophobization treatment; and a method of obtaining a hydrophobic silica particle dispersion liquid, subsequently drying the dispersion liquid to obtain hydrophobic silica particles in a powder form, subsequently adding a hydrophobization treating agent to apply a hydrophobization treatment, and thereby obtaining hydrophobic silica particles in a powder form.

Here, an example of the method of subjecting silica particles in a powder form to a hydrophobization treatment, may be a method of stirring hydrophilic silica particles in a powder form in the treatment tank of a Henschel mixer, a fluidized bed reactor or the like, adding a hydrophobization treating agent thereto, heating the content of the treatment tank to gasify the hydrophobization treating agent, and thereby allowing the hydrophobization treating agent to react with the silanol groups at the surface of the silica particles in a powder form. The treatment temperature is not particularly limited; but for example, the treatment temperature is suitably from 80 to 300° C., and desirably from 120 to 200° C.

EXAMPLES

Hereinafter, the present exemplary embodiment will be more specifically described in detail by way of Examples and Comparative Examples, but the exemplary embodiment is not intended to be limited to these Examples. Unless particularly state otherwise, the unit "part" represents "part by weight."

Example 1

In a 1.5 L glass reaction vessel equipped with a stirrer, a dropping nozzle and a thermometer, 200 g of methanol and 33 g of 10% aqueous ammonia ($NH_4OH$) are added and mixed, and thereby an alkali catalyst solution is obtained. In this instance, the amount of catalyst: amount of $NH_3$ in the alkali catalyst solution ($NH_3/(NH_3+$methanol+water)) is 0.68 mol/L.

This alkali catalyst solution is adjusted to 25° C., and then while the alkali catalyst solution is stirred, the addition of 100 g of tetramethoxysilane (TMOS) and the addition of 79 g of 3.8% aqueous ammonia ($NH_4OH$) are simultaneously initiated, with the flow rates adjusted such that the amount of $NH_3$ per mole of the total amount of supply of the tetraalkoxysilane supplied in one minute, may be 0.27 moles. As such, dropwise addition of the two substances is carried out over 60 minutes, and thus a suspension liquid of silica particles is obtained. However, the amount of supply of the tetraalkoxysilane is adjusted to 0.0018 mol/(mol·min) relative to the number of moles of alcohol in the alkali catalyst solution.

Subsequently, 150 g of the solvent is distilled off by heating and distillation, 150 g of pure water is added to the residue, and then the mixture is dried in a freeze dryer. Thus, atypically shaped hydrophilic silica particles are obtained.

Furthermore, 7 g of hexamethyldisilazane is added to 35 g of the atypically shaped hydrophilic silica particles, and the mixture is allowed to react for 2 hours at 150° C., thereby subjecting the silica particles to a hydrophobization treatment. Thus, atypically shaped hydrophobic silica particles (1) having an average particle size of 170 nm and an average degree of circularity [100/SF2] of 0.82 are obtained.

The status of the generation of coarse aggregates of the atypically shaped hydrophobic silica particles that are obtained is evaluated, and the occurrence of coarse aggregates is not recognized.

In regard to the method of measuring the average particle size, silica particles are dispersed among iron powder particles or resin particles (polyester, weight average molecular weight Mw=50,000), each having a particle size of 100 μm, and then 100 primary particles of the silica particles are observed with a scanning electron microscopic (SEM) apparatus. The average particle size means the 50% diameter (D50v) in the cumulative frequency of the circle-equivalent diameter obtained by an image analysis of the SEM images of the silica particles.

Furthermore, in regard to the method of measuring the average degree of circularity, silica particles are dispersed among iron powder particles or resin particles (polyester, weight average molecular weight Mw=50,000), each having a particle size of 100 μm, and then 100 primary particles of the silica particles are observed with a scanning electron microscopic (SEM) apparatus. The average particle size means the 50% degree of circularity in the cumulative frequency of the degree of circularity obtained by an image analysis of the SEM images of the silica particles. Furthermore, the degree of circularity can also be determined by the following formula, from the projected area and circumference obtained by the image analysis.

Degree of circularity=$4\pi \times$projected area/(circumference)$^2$                      Formula:

In regard to the evaluation of the status of the generation of coarse aggregates, 0.05 g of silica particles are added to a mixed liquid of 40 g of pure water and 1 g of methanol, and the mixture is dispersed for 10 minutes with an ultrasonic dispersing machine. Then, the particle size distribution is measured with a particle size analyzer (trade name: LS COULTER, manufactured by Beckman Coulter, Inc.), and the presence or absence of coarse aggregates having a size of 10 μm or greater is evaluated.

Example 2

Atypically shaped hydrophobic silica particles (2) are obtained in the same manner as in Example 1, except that the amount of the 10% aqueous ammonia used in the preparation of the alkali catalyst solution is changed to 32 g (amount of alkali catalyst 0.66 mol/L).

Example 3

Atypically shaped hydrophobic silica particles (3) having an average particle size of 200 nm and an average degree of circularity [100/SF2] of 0.83 are obtained in the same manner as in Example 1, except that the amount of the 10% aqueous ammonia used in the preparation of the alkali catalyst solution is changed to 37 g (amount of catalyst 0.75 mol/L).

Example 4

Atypically shaped hydrophobic silica particles (4) are obtained in the same manner as in Example 1, except that the concentration of the aqueous ammonia that is simultaneously added dropwise with tetramethoxysilane is adjusted to 2.74%, and the amount of dropwise addition of the aqueous ammonia is adjusted to 62 g, so that the amount of NH$_3$ that is added dropwise is adjusted to 0.15 moles per mole of the total amount of supply of the tetraalkoxysilane supplied in one minute.

Example 5

Atypically shaped hydrophobic silica particles (5) are obtained in the same manner as in Example 1, except that the concentration of the aqueous ammonia that is simultaneously added dropwise with tetramethoxysilane is adjusted to 4.10%, and the amount of dropwise addition of the aqueous ammonia is adjusted to 83 g, so that the amount of NH$_3$ that is added dropwise is adjusted to 0.30 moles per mole of the total amount of supply of the tetraalkoxysilane supplied in one minute.

Example 6

Atypically shaped silica particles (6) are obtained in the same manner as in Example 1, except that the amount of dropwise addition of tetramethoxysilane and the amount of dropwise addition of aqueous ammonia are adjusted, and thus the time taken from the initiation of dropwise addition to the completion of dropwise addition is shortened to 30 minutes.

Example 7

Atypically shaped silica particles (7) are obtained in the same manner as in Example 1, except that the amount of dropwise addition of tetramethoxysilane and the amount of dropwise addition of aqueous ammonia are adjusted, and thus the time taken from the initiation of dropwise addition to the completion of dropwise addition is shortened to 20 minutes.

Example 8

Atypically shaped silica particles (8) are obtained in the same manner as in Example 1, except that the amount of dropwise addition of tetramethoxysilane and the amount of dropwise addition of aqueous ammonia are adjusted, and thus the time taken from the initiation of dropwise addition to the completion of dropwise addition is shortened to 15 minutes.

Comparative Example 1

Hydrophobic silica particles are produced in the same manner as in Example 1, except that the amount of the 10% aqueous ammonia used in the preparation of the alkali catalyst solution is adjusted to 45 g (amount of catalyst 0.89 mol/L), and spherically shaped hydrophobic silica particles (9) are obtained.

Comparative Example 2

Hydrophobic silica particles are produced in the same manner as in Example 1, except that the amount of the 10% aqueous ammonia used in the preparation of the alkali catalyst solution is adjusted to 55 g (amount of catalyst 1.05 mol/L), and spherically shaped hydrophobic silica particles (10) are obtained.

Comparative Example 3

Hydrophobic silica particles are produced in the same manner as in Example 1, except that the concentration of the aqueous ammonia that is simultaneously added dropwise with tetramethoxysilane is adjusted to 5.0%, and the amount of the aqueous ammonia is adjusted to 100 g, so that the amount of NH₃ that is added dropwise is adjusted to 0.45 moles per mole of the total amount of supply of the tetraalkoxysilane supplied in one minute, and spherically shaped hydrophobic silica particles (11) are obtained.

Comparative Example 4

Hydrophobic silica particles are produced in the same manner as in Example 1, except that the concentration of the aqueous ammonia that is simultaneously added dropwise with tetramethoxysilane is adjusted to 1.82%, and the amount of dropwise addition of the aqueous ammonia is adjusted to 55 g, so that the amount of NH₃ that is added dropwise is adjusted to 0.09 moles per mole of the total amount of supply of the tetraalkoxysilane supplied in one minute. However, the reaction mixture is gelled during the granulation process, and thus silica particles are not obtainable.

Comparative Example 5

Hydrophobic silica particles are produced in the same manner as in Example 1, except that the amount of the 10% aqueous ammonia used in the preparation of the alkali catalyst solution is adjusted to 10 g. However, the reaction mixture is gelled during the granulation process, and thus silica particles are not obtainable.

Comparative Example 6

Hydrophobic silica particles are produced in the same manner as in Example 1, except that the amount of the 10% aqueous ammonia used in the preparation of the alkali catalyst solution is adjusted to 28 g (amount of catalyst 0.58 mol/L), and atypically shaped hydrophobic silica particles (12) in mixture with coarse aggregates are obtained.

Lists of the particulars of the silica particles of the respective Examples and the characteristics of the silica particles thus obtained are presented in Table 1 and Table 2 shown below.

TABLE 2

| | Characteristics of silica particles | | | |
|---|---|---|---|---|
| | Average particle size D50v [nm] | Average degree of circularity | Shape | Evaluation on the status of occurrence of coarse aggregates |
| Example 1 | 170 | 0.82 | Atypically shaped | None |
| Example 2 | 150 | 0.80 | Atypically shaped | None |
| Example 3 | 200 | 0.83 | Atypically shaped | None |
| Example 4 | 140 | 0.80 | Atypically shaped | None |
| Example 5 | 180 | 0.84 | Atypically shaped | None |
| Example 6 | 175 | 0.81 | Atypically shaped | None |
| Example 7 | 180 | 0.80 | Atypically shaped | None |
| Example 8 | 185 | 0.79 | Atypically shaped | None |
| Comparative Example 1 | 150 | 0.93 | Spherical | None |
| Comparative Example 2 | 170 | 0.94 | Spherical | None |
| Comparative Example 3 | 180 | 0.93 | Spherical | None |
| Comparative Example 4 | Gelled | — | — | — |
| Comparative Example 5 | Gelled | — | — | — |
| Comparative Example 6 | 175 | 0.80 | Atypically shaped | Mixture |

It can be seen from the results shown above that the present Examples generate coarse aggregates at a lower level compared with the Comparative Examples, and yield atypically shaped silica particles.

What is claimed is:

1. A method of producing silica particles, the method comprising: preparing an alkali catalyst solution containing an

TABLE 1

| | Alkali catalyst solution composition | | | Particle generating step | | | |
|---|---|---|---|---|---|---|---|
| | Methanol [g] | Aqueous ammonia [g] | Amount of NH₃ [mol/L] | TMOS: total amount of supply [g] | TMOS: amount of supply relative to the mole number of alcohol in alkali catalyst solution [mol/mol · min] | Aqueous ammonia: total amount of supply [g] | Aqueous ammonia: NH₃ concentration [wt %] | Amount of supply of NH₃ [mol (mole number relative to 1 mole of total amount of supply of TMOS supplied in 1 minute)] |
| Example 1 | 200 | 33 | 0.68 | 100 | 0.0018 | 79 | 3.8 | 0.27 |
| Example 2 | 200 | 32 | 0.66 | 100 | 0.0018 | 79 | 3.8 | 0.27 |
| Example 3 | 200 | 37 | 0.75 | 100 | 0.0018 | 79 | 3.8 | 0.27 |
| Example 4 | 200 | 33 | 0.68 | 100 | 0.0018 | 62 | 2.74 | 0.15 |
| Example 5 | 200 | 33 | 0.68 | 100 | 0.0018 | 83 | 4.1 | 0.3 |
| Example 6 | 200 | 33 | 0.68 | 100 | 0.0035 | 79 | 3.8 | 0.27 |
| Example 7 | 200 | 33 | 0.68 | 100 | 0.0053 | 79 | 3.8 | 0.27 |
| Example 8 | 200 | 33 | 0.68 | 100 | 0.0070 | 79 | 3.8 | 0.27 |
| Comparative Example 1 | 200 | 45 | 0.89 | 100 | 0.0018 | 79 | 3.8 | 0.27 |
| Comparative Example 2 | 200 | 55 | 1.05 | 100 | 0.0018 | 79 | 3.8 | 0.27 |
| Comparative Example 3 | 200 | 33 | 0.68 | 100 | 0.0018 | 100 | 5 | 0.45 |
| Comparative Example 4 | 200 | 33 | 0.68 | 100 | 0.0018 | 55 | 1.82 | 0.09 |
| Comparative Example 5 | 200 | 10 | 0.22 | 100 | 0.0018 | 79 | 3.8 | 0.27 |
| Comparative Example 6 | 200 | 28 | 0.58 | 100 | 0.0018 | 79 | 3.8 | 0.27 | alkali catalyst in a solvent including an alcohol, at a concentration of from about 0.6 mol/L to about 0.85 mol/L; and supplying tetraalkoxysilane into the alkali catalyst solution, and concurrently supplying an alkali catalyst into the alkali catalyst solution at a rate of from about 0.1 mol to about 0.4 mol per mol of the total amount of supply of the tetraalkoxysilane supplied in one minute, wherein the silica particles produced are atypically shaped having an average degree of circularity of from about 0.5 to about 0.85.

2. The method of producing silica particles of claim 1, wherein the solvent further includes at least one selected from the group consisting of water, a ketone, a cellosolve, and an ether.

3. The method of producing silica particles of claim 1, wherein the solvent is at least one selected from the group consisting of acetone, methyl ethyl ketone, and methyl isobutyl ketone.

4. The method of producing silica particles of claim 1, wherein the solvent is at least one selected from the group consisting of methylcellosolve, ethylcellosolve, butylcellosolve and cellosolve acetate.

5. The method of producing silica particles of claim 1, wherein the solvent is at least one selected from the group consisting of dioxane and tetrahydrofuran.

6. The method of producing silica particles of claim 2, wherein an amount of alcohol with respect to the at least one selected from the group consisting of water, a ketone, a cellosolve, and an ether is about 80% by weight or greater.

7. The method of producing silica particles of claim 1, wherein the alkali catalyst is at least one catalyst selected from the group consisting of ammonia, urea, monoamine, and a quaternary ammonium salt.

8. The method of producing silica particles of claim 1, wherein the tetraalkoxysilane is selected from the group consisting of tetramethoxysilane, tetraethoxysilane, tetrapropoxysilane, and tetrabutoxysilane.

9. The method of producing silica particles of claim 1, wherein an amount of supply of the tetraalkoxysilane is from about 0.001 mol/(mol·min) to about 0.01 mol/(mol·min) relative to number of moles of the alcohol in the alkali catalyst solution.

10. The method of producing silica particles of claim 1, wherein upon supplying the tetraalkoxysilane, a temperature of the alkali catalyst solution is from about 5° C. to about 50° C.

11. The method of producing silica particles of claim 1, further comprising removing the solvent.

12. The method of producing silica particles of claim 11, further comprising drying a residue obtained by removing the solvent.

13. The method of producing silica particles of claim 12, wherein a drying temperature is about 200° C. or lower.

14. The method of producing silica particles of claim 1, further comprising hydrophobizing a surface of the silica particles.

15. The method of producing silica particles of claim 14, wherein a hydrophobization treating agent is used for the hydrophobizing, and the hydrophobization treating agent is an organosilicon compound having an alkyl group.

16. The method of producing silica particles of claim 15, wherein the alkyl group is at least one selected from the group consisting of a methyl group, an ethyl group, a propyl group, and a butyl group.

17. The method of producing silica particles of claim 15, wherein an addition amount of the hydrophobization treating agent is from about 1% by weight to about 100% by weight with respect to the silica particles.

* * * * *